S. E. MONTGOMERY.
PLANTER.
APPLICATION FILED MAR. 25, 1910.

968,250.

Patented Aug. 23, 1910.

2 SHEETS—SHEET 1.

Witnesses
E. F. Stewart
A. Easterday

Samuel E. Montgomery,
Inventor by C. A. Snow & Co.
Attorneys

THE NORRIS PETERS CO., WASHINGTON, D. C.

S. E. MONTGOMERY.
PLANTER.
APPLICATION FILED MAR. 25, 1910.
968,250.
Patented Aug. 23, 1910.
2 SHEETS—SHEET 2.
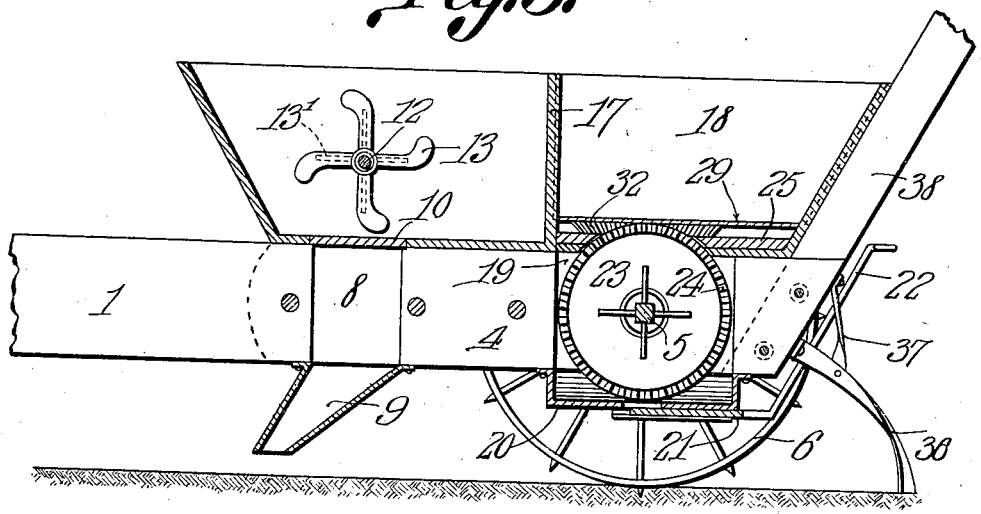
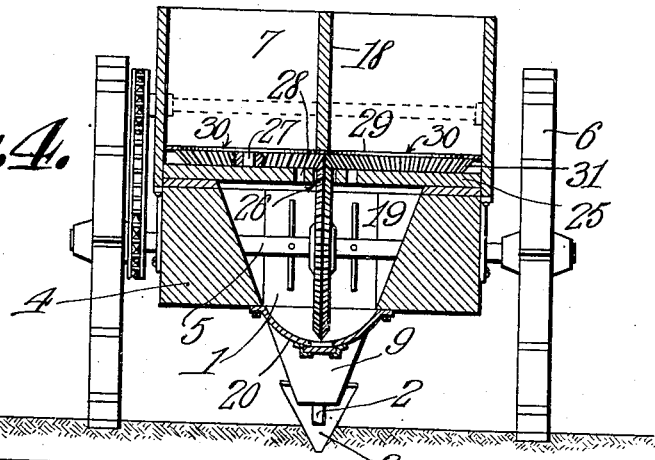
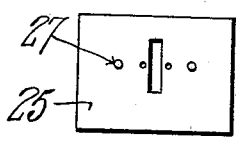
Witnesses
E. F. Stewart
A. Easterday
Samuel E. Montgomery,
Inventor
by C. A. Snow & Co.
Attorneys

UNITED STATES PATENT OFFICE.

SAMUEL E. MONTGOMERY, OF BALL GROUND, GEORGIA, ASSIGNOR OF ONE-HALF TO JOSEPH E. WATKINS, OF BALL GROUND, GEORGIA.

PLANTER.

968,250.  Specification of Letters Patent.  Patented Aug. 23, 1910.

Application filed March 25, 1910. Serial No. 551,532.

*To all whom it may concern:*

Be it known that I, SAMUEL E. MONTGOMERY, a citizen of the United States, residing at Ball Ground, in the county of Cherokee and State of Georgia, have invented a new and useful Planter, of which the following is a specification.

This invention relates to planters and it consists in the novel construction and arrangement of its parts as hereinafter shown and described.

The object of the invention is to provide a simple and durable planter adapted to plant two different kinds of seed, as for instance, corn and beans, simultaneously; the planter also having means for dropping fertilizer at the same time.

With this object in view the planter includes a frame attached to the beam of a furrow opener and having a hopper mounted thereon. The hopper is provided with partitions whereby it is divided into compartments adapted to contain the fertilizer and the different kinds of seed. A stirrer is mounted in the compartment of the hopper adapted to contain the fertilizer and is operatively connected with one of the supporting wheels of the frame. Seed separating plates are located in the compartments adapted to contain the different kinds of seed and a means is mounted upon the axle of the frame and is operatively connected with both of said seed separating plates.

Figure 1:
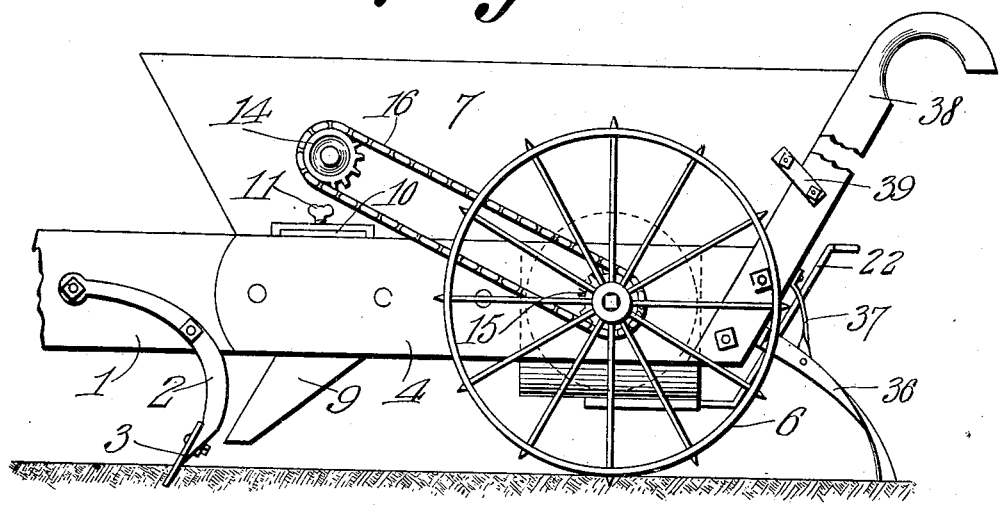
Figure 2:
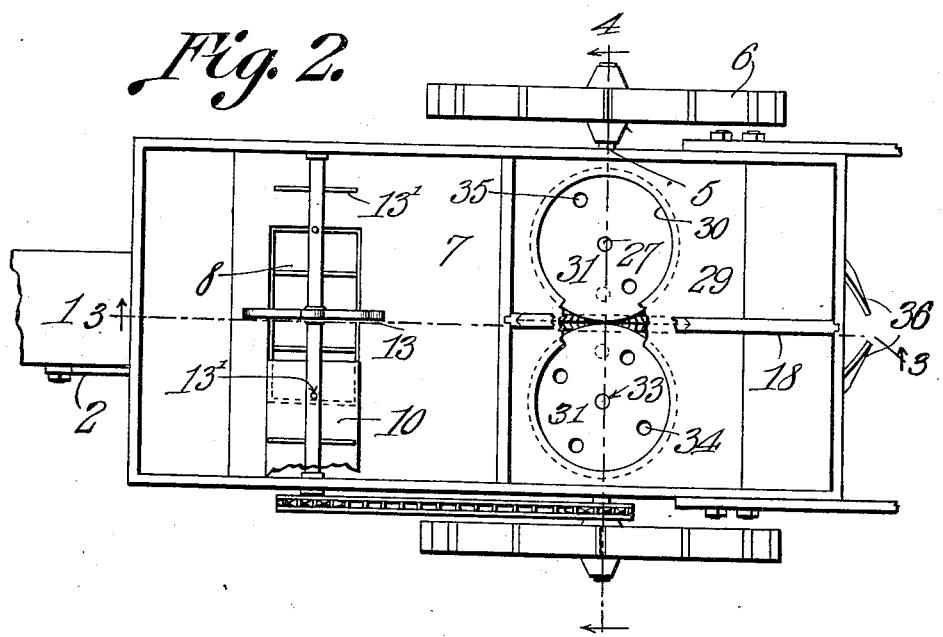

In the accompanying drawings:—Figure 1 is a side elevation of the planter. Fig. 2 is a top plan view of the same. Fig. 3 is a vertical longitudinal sectional view of the same cut on the line 3—3 of Fig. 2. Fig. 4 is a transverse sectional view of the same cut on the line 4—4 of Fig. 2. Fig. 5 is a plan view of a plate used in the bottom of the hopper.

The planter includes a beam 1 to which is attached a standard 2 carrying a furrow opener 3. A frame 4 is connected with the rear portion of the beam 1 and is mounted upon an axle 5 which in turn is supported upon traction or ground wheels 6. A hopper 7 is mounted upon the frame 4 and is provided at the forward portion of its bottom with an outlet 8 which is located over a chute 9 which depends from the said frame 4 and has its outlet end located behind the furrow opener 3. A slide 10 is adjustably mounted upon the frame 4 and is held in an adjusted position by means of a set screw 11 shown in Fig. 1 of the drawings. The said slide is adapted to be moved to increase or diminish the passage way leading from the hopper 7 to the chute 9. A shaft 12 is journaled in the forward portion of the hopper 7 and is provided with approximately radially disposed arms 13 and fingers 13'. A sprocket wheel 14 is fixed to the end portion of the shaft 12 and a sprocket wheel 15 is fixed to the axle 5. A sprocket chain 16 passes around the wheels 14 and 15 and is adapted to transmit rotary movement from the axle 5 to the shaft 12. The hopper 7 is divided into compartments by means of the partitions 17 and 18 which are disposed at a right angle to each other; the partition 17 is fixed and is transversely disposed of the hopper 7 and the partition 18 is longitudinally disposed thereof and is removable. The rear portion of the bottom of the hopper 7 is provided with an opening 19 which communicates with the upper end of a chute 20 the delivery end of which is located behind the delivery end of the chute 9. A valve 21 is located in the chute 20 and is connected with a handle lever 22 whereby the said valve 21 may be adjusted in the said chute 20 to increase or diminish the passage way therethrough. A gear wheel 23 is fixed to the intermediate portion of the axle 5 and is provided upon its opposite sides and at its periphery with beveled gear teeth 24. The upper portion of the periphery of the wheel 23 projects through the opening 19 in the bottom of the hopper 7. A plate 25 rests upon the rear portion of the bottom of the hopper 7 and is provided with an opening 26 through which the upper portion of the periphery of the wheel 23 projects. The plate 25 is provided with gudgeons 27 which are adapted to act as spindles for the disks to be explained later. The plate 25 is also provided with openings 28 which are adapted to register with openings provided in the said disks above referred to and to be explained hereafter. A plate 29 is located in the rear portion of the hopper 7. The plate 29 is provided with relatively large circular openings 30. Disks 31 are located under the openings 30 in the plate 29 and are provided at their edges with beveled gear teeth 32 which mesh with the gear teeth 24 provided upon the wheel 23. The disks 31 are also provided with central bearing perforations 33 which receive the gudgeons 27. As illustrated in Fig. 4 of the drawings, the partition 18 is vertically above the wheel 23 and its lower edge is immediately above the meeting or adjacent edges of the disks 31. One of the disks 31 is provided with a maximum number of seed receiving perforations 34 while the other disk 31 is provided with a minimum number of seed receiving perforations 35.

Coverers are attached to the rear portion of the frame 4 and are preferably in the form of spring arms 36 to which are attached the lower ends of braces 37 the upper end portions of the said braces being adjustably connected with handles 38 mounted upon the rear portion of the frame 4. Straps 39 are attached to the outer sides of the hopper 7 and are also connected with the handles 38 and serve as means for bracing the said hopper 7 in position upon the frame 4.

The operation of the planter is as follows: When it is desired to plant two different kinds of seed as for instance corn and beans simultaneously, and at the same time drop fertilizer in the furrow opened by the furrow opener of the planter, the fertilizer is placed in the forward compartment of the hopper 7, and the corn is placed in that compartment of the hopper 7 at the rear thereof in which is journaled the plate 31 containing the major number of seed receiving perforations 34. The beans are placed in that compartment in which is located the plate 31 containing the minor number of seed receiving perforations 35. The valve 10 is adjusted to regulate the flow of fertilizer from the forward compartment of the hopper 7 through the chute 9 and the sliding valve 21 is opened to its fullest extent. As the planter passes along the ground the furrow opener 3 opens a furrow and the stirring arms 13 direct the fertilizer from the forward compartment of the hopper 7 down through the chute 9 into the furrow opened by the said furrow opener. As the axle 5 rotates the wheel 23 rotates with the same and through the intermeshing teeth 24 upon the wheel 23 and the teeth 32 upon the disk 31, the said disks 31 are rotated upon the gudgeons 27. As the said disks rotate the perforations 34 in one of the disks 31 will receive corn from one of the rear compartments of the hopper 7 while the other disk 31 will receive in its perforation 35 beans. When the perforations 34 and 35 are directly above the openings 28 in the plate 25, the kernels previously received in the said perforations 34 and 35 will fall through the perforations 28 into the chute 20 and from the delivery end of the said chute the seed will fall into the furrow above the fertilizer. The seed thus deposited is covered by the coverers 36. In practice the number of perforations 34 is twice as great as the number of perforations 35 and the perforations 35 are so arranged upon that disk 31 carrying the same as to be over one of the perforations 28 in the plate 25 at the same time that one of the perforations 34 in the other plate 31 is over one of the perforations 28 in the plate 25. However, the arrangement of the perforations 34 and 35 in the plates 31 is such that at the time that every other perforation 34 in the plate 31 carrying the same is over one of the perforations 28 in the plate 25, the other perforation 28 in the plate 25 is covered by the other disk 30. Thus in every other hill of corn there is planted beans and in the resulting crop every other hill of corn stalks will be accompanied by bean vines.

At times it may be desired to use the planter for the purpose of planting cotton seed or other lint bearing seed and when this is the case the partition 18 is removed from the hopper 7. The plates 25 and 29 are also removed and the valve 21 is adjusted in the chute 20 to regulate the passage through the said chute as desired. The cotton seed is then placed in the hopper 7 and as the planter is drawn along the ground the wheels 23 will engage the seed and pass the same through the chute 20.

Having described the invention what I claim as new and desire to secure by Letters-Patent is:

1. A planter comprising a frame, an axle journaled thereto, ground wheels mounted upon the axle, a hopper mounted upon the frame and having a seed outlet, a wheel fixed to the axle and having at the opposite sides of its periphery beveled gear teeth, a plate located in the bottom of the hopper and having seed perforations, said plate also having bearing perforations, disks having gudgeons journaled in said bearing perforations of the plate, said disks having upon their peripheries beveled gear teeth which mesh with the beveled gear teeth upon said wheel, said disks also having seed perforations adapted to register with the perforations in the plate, a second plate resting upon the first said plate and having openings which snugly receive said disks.

2. A planter comprising a frame, an axle journaled to the frame, supporting wheels mounted upon the axle, a hopper mounted upon the frame and having a seed outlet, a wheel mounted upon the axle and having at the opposite sides of its periphery beveled gear teeth, a plate located in the hopper and having an opening which receives the upper portion of the periphery of said wheel, said plate also having seed perforations, said plate also having bearing perforations, disks mounted upon the upper side of said plate and having gudgeons journaled in the bearing perforations of the plate, said disks having at their peripheries beveled gear teeth which mesh with the beveled gear teeth
5 upon said wheel, said disks also having seed perforations adapted to register with the seed perforations in said plate, one of the said disks having a greater number of seed perforations than the other disk, a second
10 plate resting upon the first said plate and having openings which snugly receive the said disk.

In testimony that I claim the foregoing as my own, I have hereto affixed my signature in the presence of two witnesses.

SAMUEL E. MONTGOMERY.

Witnesses:
   J. L. WHITTEMORE,
   J. M. LANSAN.